US012579826B2

(12) United States Patent
Mori et al.

(10) Patent No.: US 12,579,826 B2
(45) Date of Patent: Mar. 17, 2026

(54) IMAGE PROCESSING SYSTEM FOR MASKING SELECTED VEHICLES IN IMAGE DATA

(71) Applicant: TOYOTA JIDOSHA KABUSHIKI KAISHA, Toyota (JP)

(72) Inventors: Masahiro Mori, Nisshin (JP); Takahiro Fujita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 18/480,699

(22) Filed: Oct. 4, 2023

(65) Prior Publication Data

US 2024/0221398 A1 Jul. 4, 2024

(30) Foreign Application Priority Data

Dec. 28, 2022 (JP) ................................. 2022-211487

(51) Int. Cl.
*G06V 20/62* (2022.01)
*G06V 20/40* (2022.01)

(52) U.S. Cl.
CPC ............ *G06V 20/625* (2022.01); *G06V 20/46* (2022.01); *G06V 2201/08* (2022.01)

(58) Field of Classification Search
CPC ... G06V 20/625; G06V 20/46; G06V 2201/08
See application file for complete search history.

(56) References Cited

U.S. PATENT DOCUMENTS

| | | |
|---|---|---|
| 2011/0043341 A1 | 2/2011 | Kumagami |
| 2019/0096215 A1* | 3/2019 | Shahid .............. G08G 1/09626 |
| 2020/0250401 A1 | 8/2020 | Kaneishi et al. |
| 2021/0192816 A1 | 6/2021 | Watanabe et al. |
| 2021/0385412 A1* | 12/2021 | Matula ..................... H04N 7/15 |
| 2022/0230457 A1* | 7/2022 | Buscemi .............. G06V 20/625 |

FOREIGN PATENT DOCUMENTS

| | | | | |
|---|---|---|---|---|
| CN | 109166353 A | * | 1/2019 | ............ G08G 1/167 |
| JP | 2001-023072 A | | 1/2001 | |
| JP | 2009-245385 A | | 10/2009 | |
| JP | 2010-237798 A | | 10/2010 | |
| JP | 2011-039983 A | | 2/2011 | |
| JP | 2019-186777 A | | 10/2019 | |
| JP | 2020-127194 A | | 8/2020 | |
| KR | 10-2014-0144398 A | | 12/2014 | |

OTHER PUBLICATIONS

Office Action issued to Japanese application No. 2022-211487 on Oct. 14, 2025.

* cited by examiner

*Primary Examiner* — Casey L Kretzer
(74) *Attorney, Agent, or Firm* — SoraIP, Inc.

(57) ABSTRACT

The image processing system includes a processor that generates an image by performing image processing on moving image data in which a plurality of vehicles is shot. The processor classifies the vehicles into an object vehicle and another vehicle other than the object vehicle, based on license plate information in the moving image data, and generates the image by performing masking processing for hiding selected vehicles, out of the object vehicle and the other vehicle, in a frame included in the moving image data.

5 Claims, 5 Drawing Sheets

100

<BEST SHOT>                                    <ANOTHER FRAME>

4

2                                              4

<IMAGE WITH MASKING PROCESSING>

2

IMAGE PROCESSING SYSTEM FOR MASKING SELECTED VEHICLES IN IMAGE DATA

CROSS-REFERENCE TO RELATED APPLICATION

This application claims priority to Japanese Patent Application No. 2022-211487 filed on Dec. 28, 2022, incorporated herein by reference in its entirety.

BACKGROUND

1. Technical Field

The present disclosure relates to an image processing system, and more particularly to technology for shooting vehicles.

2. Description of Related Art

A vehicle image display device disclosed in Japanese Unexamined Patent Application Publication No. 2011-39983 (JP 2011-39983 A) includes a shooting unit and a mask image generating unit. The shooting unit includes a plurality of cameras that shoot images of regions ahead of and rearward of the vehicle, and can shoot images around the vehicle. The mask image generating unit generates a mask image that hides, in the camera images shot with the cameras, personal information protection regions included in images of vehicles approaching ahead or rearward of the own vehicle.

SUMMARY

Users who like to drive may have a desire to shoot an external appearance of their vehicles while driving. Posting (uploading) shot images to a social networking service (SNS), for example, enables the users to have many people see the images. However, it is difficult for a user to shoot the external appearance of a traveling vehicle while driving the vehicle himself/herself. Accordingly, services for shooting the external appearance of traveling vehicles has been proposed.

When the service is provided at a racing circuit or the like, a situation may arise in which a vehicle of a user (hereinafter also referred to as "object vehicle") travels along with a vehicle of another user (hereinafter also referred to as "other vehicle"). Uploading an image shot in such a situation to the SNS without alteration may lead to trouble. This is because there is a possibility that the object vehicle may be identified or the other vehicle may be identified.

The present disclosure has been made to solve the above issues, and it is an object of the present disclosure to circumvent trouble associated with shooting vehicles.

(1) An image processing system according to an aspect of the present disclosure includes a processor that generates an image by performing image processing on moving image data in which a plurality of vehicles is shot. The processor classifies the vehicles into an object vehicle and another vehicle other than the object vehicle, based on license plate information in the moving image data, and generates the image by performing masking processing that hides a selected vehicle, out of the object vehicle and the other vehicle, in a frame included in the moving image data.

(2) When both the object vehicle and the other vehicle are included in a first frame in the moving image data, the processor extracts a region in which the other vehicle is shot in the first frame, in a second frame that is different from the first frame, clips out a region corresponding to the extracted region of the other vehicle, and replaces the other vehicle in the first frame with the region that is clipped.

(3) The processor performs the masking processing on at least one of a license plate of the object vehicle, a window glass of the object vehicle, a license plate of the other vehicle, a window glass of the other vehicle, and an entirety of the other vehicle.

(4) The processor classifies the vehicles into the object vehicle and the other vehicle, based on external appearance information of the vehicles, in addition to the license plate information.

According to the present disclosure, trouble associated with shooting vehicles can be circumvented.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
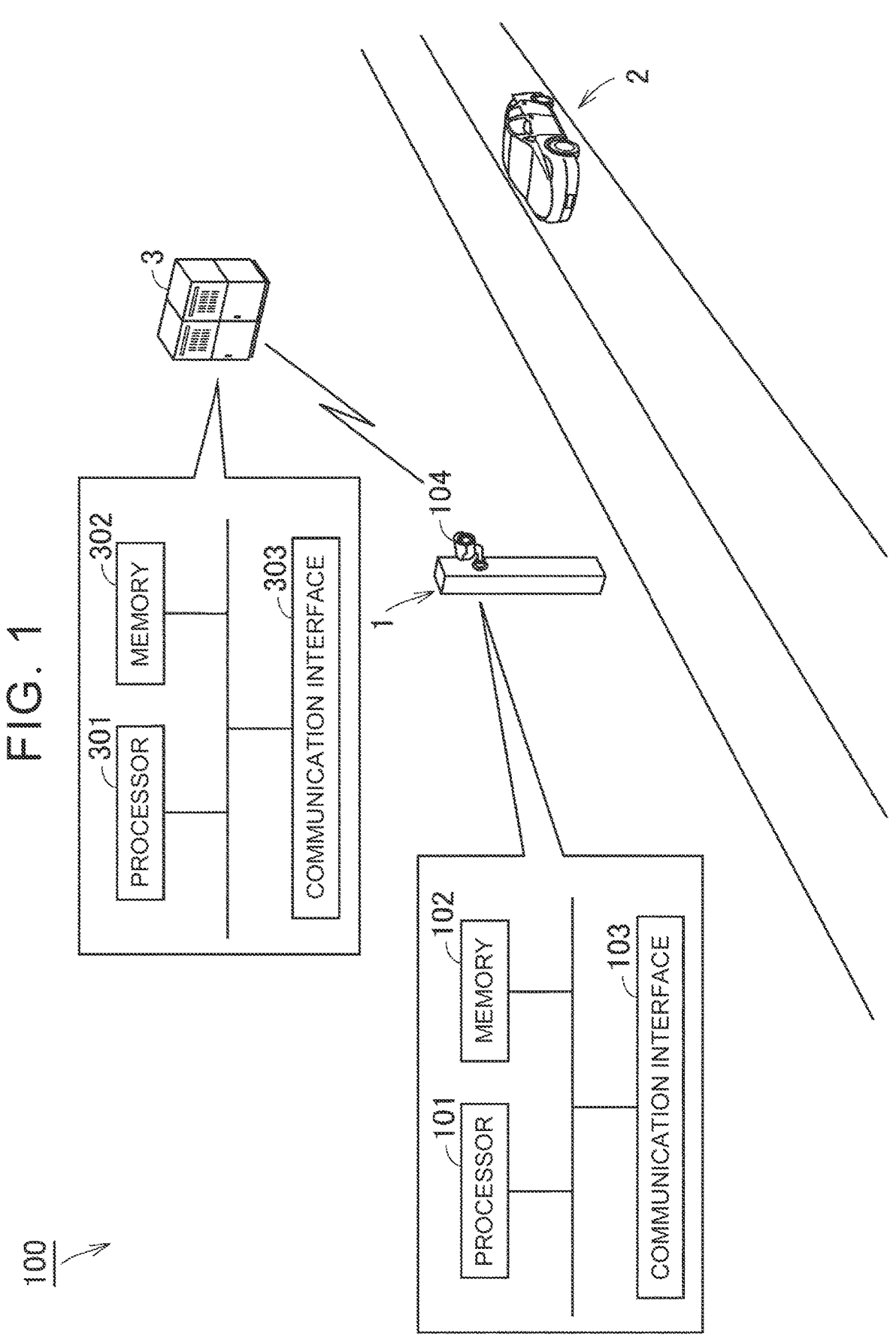
FIG. 1 is a diagram showing a configuration example of an image processing system according to an embodiment of the present disclosure.

Hereinafter, embodiments of the present disclosure will be described in detail with reference to the drawings. In the drawings, the same or corresponding portions are denoted by the same reference signs and the description thereof will not be repeated.

Embodiment

System Configuration

FIG. 1 is a diagram illustrating a configuration example of an image processing system according to an embodiment of the present disclosure. The image processing system 100 provides a vehicle shooting service for shooting the exterior of a running vehicle. A user can have many people see the image by uploading the image of the vehicle that is running by the user to the SNS.

An image processing system 100 includes a vehicle shooting device 1. The vehicle shooting device 1 includes processor 101, memory 102, communication interface 103, and camera 104. The vehicle shooting device 1 is installed, for example, near a road, and shoots moving image data of one or more vehicles traveling on the road. FIG. 1 shows a vehicle to be shot (hereinafter referred to as "object vehicle 2"). The vehicle shooting device 1 may perform image processing (part of the processing described later) on the captured moving image data.

Image processing system 100 further includes server 3. The vehicle shooting device 1 and the server 3 are connected so as to be able to communicate with each other. Server 3 includes processor 301, memory 302 and communication interface 303. The server 3 receives moving image data captured by the vehicle shooting device 1 from the vehicle shooting device 1, and performs image processing, which will be described later, on the received moving image data.

Note that the image processing system according to the present disclosure may have a configuration specialized for image processing (for example, a configuration consisting only of an image processing device) without performing shooting with a camera. In this example, the server 3 corresponds to the "image processing system" according to the present disclosure.

Shooting Trouble

Vehicles other than the object vehicle 2 (hereinafter referred to as "other vehicles") may also run on roads, circuits, etc. on which the object vehicle 2 travels. Under such circumstances, other vehicles are also shot in addition to the object vehicle 2. Uploading the image as it is to the SNS is not desirable mainly from the viewpoint of personal information leakage protection.

Therefore, in the present embodiment, image processing system 100 classifies a plurality of vehicles in moving image data into object vehicle 2 and other vehicles based on license plate information. Then, the image processing system 100 carries out masking processing to hide the vehicle selected from the object vehicle 2 and other vehicles in the frames included in the moving image data. As an example, when another vehicle is selected and the object vehicle 2 is not selected, only the other vehicle is subjected to masking processing. Then, since the personal information of other vehicles (users of other vehicles) is concealed by the masking processing, it is possible to avoid troubles during uploading to SNS.

Functional Configuration

Figure 2:
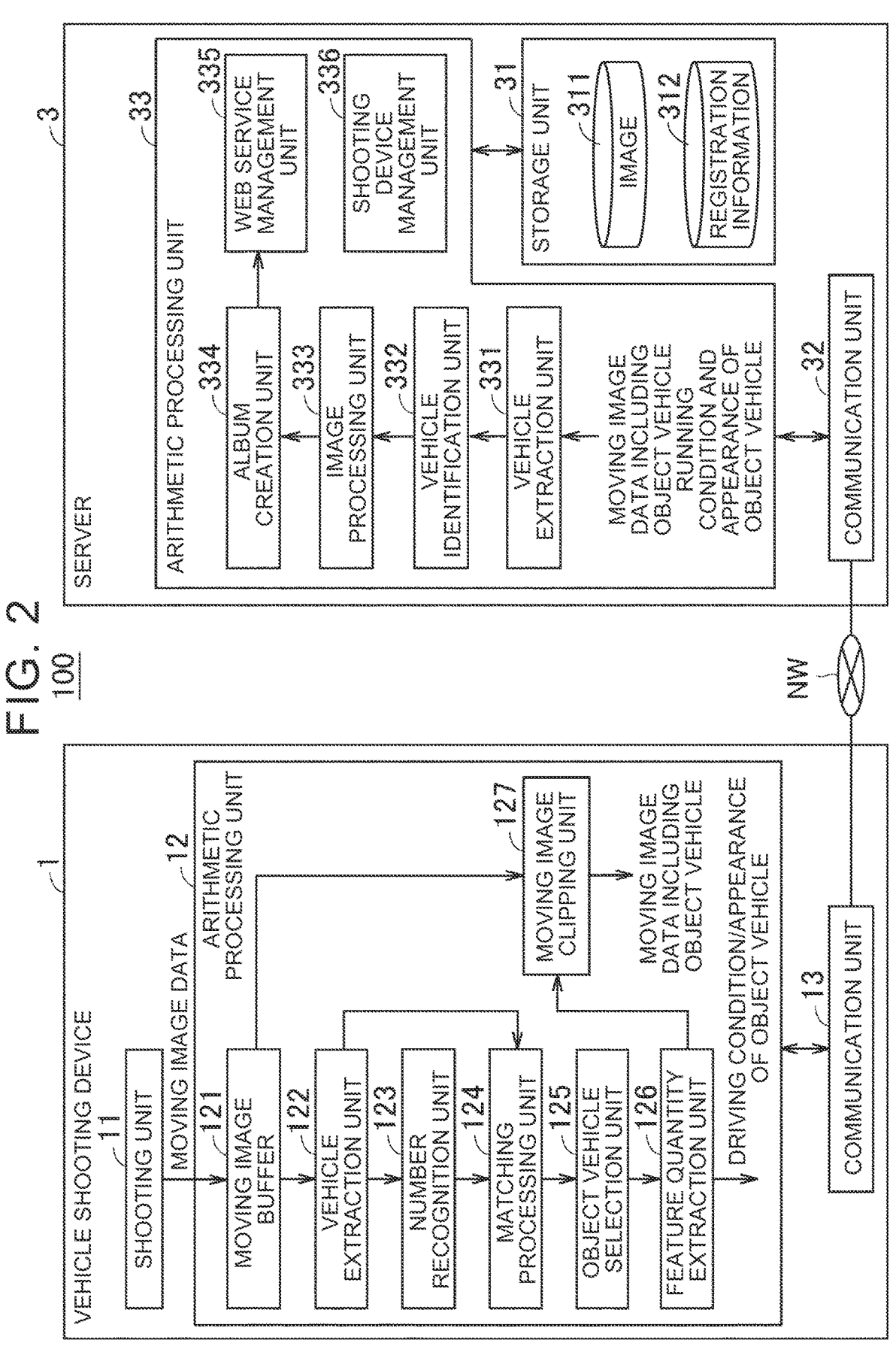
FIG. 2 is a functional block diagram showing the functional configuration of the vehicle shooting device and the server.

FIG. 2 is a functional block diagram showing functional configurations of the vehicle shooting device 1 and the server 3. The vehicle shooting device 1 includes shooting unit 11, arithmetic processing unit 12, and communication unit 13. Arithmetic processing unit 12 includes moving image buffer 121, vehicle extraction unit 122, number recognition unit 123, matching processing unit 124, object vehicle 2 selection unit 125, feature quantity extraction unit 126, and moving image clipping unit 127.

The shooting unit 11 shoots moving image data for viewing by the user of the object vehicle 2. The shooting unit 11 outputs moving image data to the moving image buffer 121. The shooting unit 11 corresponds to the camera 104 in FIG. 1.

The moving image buffer 121 temporarily stores moving image data. The moving image buffer 121 is typically a ring buffer (circular buffer) and has a circular storage area in which the head and tail of a one-dimensional array are logically connected. Newly shot moving image data is stored in the moving image buffer 121 for a predetermined amount of time that can be stored in the storage area. Moving image data exceeding the predetermined time (that is, old moving image data) is automatically deleted from the moving image buffer 121. The moving image buffer 121 outputs the moving image data to vehicle extraction unit 122 and moving image clipping unit 127. A moving image buffer 121 corresponds to the memory 102 in FIG. 1.

The vehicle extraction unit 122 extracts vehicles (not limited to the object vehicle 2, but all vehicles) from the moving image data. For this processing, for example, a trained model generated by a machine learning technique such as deep learning can be used. The vehicle extraction unit 122 outputs the moving image from which the vehicle is extracted from the moving image data (the frame including the entire vehicle) to the number recognition unit 123 and the matching processing unit 124.

The number recognition unit 123 recognizes the number of the license plate from the moving image of the vehicle extracted by the vehicle extraction unit 122. A trained model generated by a machine learning technique such as deep learning can also be used for this process. Number recognition section 123 outputs the recognized number to matching processing unit 124. Also, the number recognition unit 123 outputs the recognized number to the communication unit 13. Thereby, the number of each vehicle is transmitted to the server 3.

The matching processing unit 124 associates the vehicle extracted by the vehicle extraction unit 122 with the number recognized by the number recognition unit 123 (matching processing). More specifically, the matching processing unit 124 calculates, for each number, the distance between the number and the vehicle (the distance between the coordinates of the number and the coordinates of the vehicle on the frame). Then, the matching processing unit 124 matches the license plate number with a vehicle having a short distance from the license plate number. The matching processing unit 124 outputs the result of the matching processing (vehicles with associated numbers) to the object vehicle 2 selection unit 125.

The object vehicle 2 selection unit 125 selects, as the object vehicle 2, a vehicle whose number matches the number of the object vehicle 2 (received from the server 3) from among the vehicles whose numbers are associated by the matching process. The object vehicle 2 selection unit 125 outputs the vehicle selected as the object vehicle 2 to the feature quantity extraction unit 126.

The feature quantity extraction unit 126 extracts the feature quantity of the object vehicle 2 by analyzing the moving image data. More specifically, the feature quantity extraction unit 126 calculates the traveling speed of the object vehicle 2 based on the temporal change of the object vehicle 2 in the frame including the object vehicle 2 (for example, the amount of movement of the object vehicle 2 between frames, the amount of change in the size of the object vehicle 2 between frames). The feature quantity extraction unit 126 may calculate, for example, the acceleration (deceleration) of the object vehicle 2 in addition to the running speed of the object vehicle 2. The feature quantity extraction unit 126 may extract information about the appearance (body shape, body color, etc.) of the object vehicle 2 using a known image recognition technique. The feature quantity extraction unit 126 outputs the feature quantity (driving state and appearance) of the object vehicle 2 to the moving image clipping unit. Also, the feature quantity extraction unit 126 outputs the feature amount of the object vehicle 2 to the communication unit 13. Thereby, the feature amount of the object vehicle 2 is transmitted to the server 3.

A moving image clipping unit 127 clips a portion where the object vehicle 2 is likely to be shot from the moving image data stored in the moving image buffer 121 based on the feature quantity (running speed, acceleration, body shape, body color, etc. of the object vehicle 2) extracted by the feature quantity extraction unit 126. The moving image clipping unit 127 outputs the clipped moving image data to the communication unit 13. As a result, the moving image data included in the object vehicle 2 is transmitted to the server 3. However, the moving image clipping unit 127 may clip moving image data at a predetermined timing regardless of the feature amount extracted by the feature quantity extraction unit 126.

The communication unit 13 performs two-way communication with a communication unit 32 (described later) of the server 3 via the network NW. The communication unit 13 receives the number of the object vehicle 2 from the server 3. Further, the communication unit 13 transmits moving image data (moving image cut out from the moving image data so as to include the object vehicle 2) to the server 3. The communication unit 13 corresponds to the communication interface 103 in FIG. 1.

The server 3 includes a storage section 31, a communication unit 32 and an arithmetic processing unit 33. Storage unit 31 includes image storage unit 311 and registration information storage unit 312. The arithmetic processing unit 33 includes a vehicle extraction unit 331, a vehicle identification unit 332, an image processing unit 333, an album creation unit 334, a web service management unit 335 and a shooting device management unit 336.

The image storage unit 311 stores images for viewing obtained as a result of arithmetic processing by the server 3. More specifically, the image storage unit 311 stores images before and after processing by the image processing unit 333 and stores albums created by the album creation unit 334.

The registration information storage unit 312 stores registration information regarding the vehicle shooting service. The registration information includes personal information of the user who applied for the vehicle shooting service and vehicle information. The user's personal information includes, for example, information on the user's identification number (ID), name, date of birth, address, telephone number, and e-mail address. The user's vehicle information includes information (license plate information) on the license plate number of the vehicle. The vehicle information may include, for example, vehicle type, model year, body shape (sedan type, wagon type, one-box type, etc.), and information on body color.

The communication unit 32 performs two-way communication with the communication unit 13 of the vehicle shooting device 1 via the network NW. The communication unit 32 transmits the license plate number of the object vehicle 2 to the vehicle shooting device 1. The communication unit 32 also receives the moving image data including the object vehicle 2 and the feature amount (driving state and appearance) of the object vehicle 2 from the vehicle shooting device 1. A communication unit 32 corresponds to the communication interface 303 in FIG. 1.

The vehicle extraction unit 331 extracts vehicles (not limited to the object vehicle 2, but all vehicles) from the moving image data. A vehicle extraction model can be similarly used for this process. The vehicle extraction unit 331 outputs a moving image (a plurality of frames) from which the vehicle is extracted from the moving image data to the vehicle identification unit 332.

The vehicle identification unit 332 identifies the object vehicle 2 from among the vehicles extracted by the vehicle extraction unit 331 based on the number of the object vehicle 2. The vehicle identification unit 332 also identifies vehicles other than the object vehicle 2 as the other vehicle 4 (see FIG. 4). The vehicle identification unit 332 may identify the object vehicle 2 based on the feature amount (running state such as running speed and acceleration, and appearance such as body shape and body color) in addition to the number. A trained model generated by a machine learning technique such as deep learning can also be used for this process. The vehicle identification unit 332 outputs to the image processing unit 333 moving image data (a plurality of temporally continuous frames) in which the object vehicle 2 and the other vehicle 4 are identified.

Figure 3:
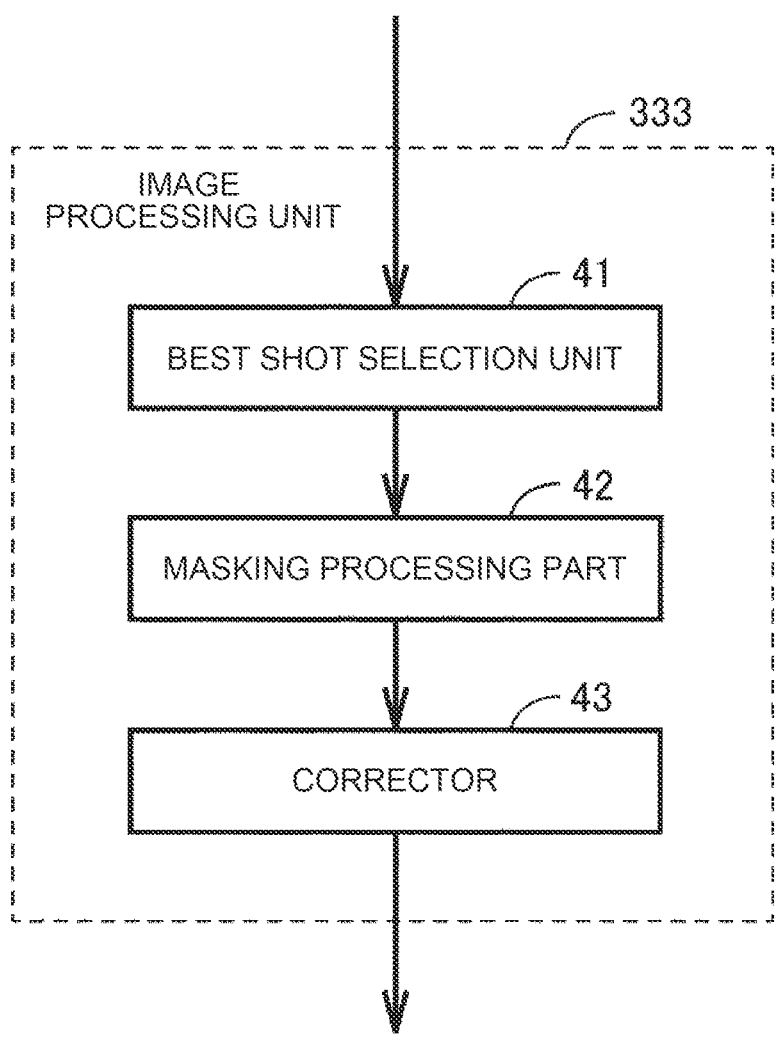
FIG. 3 is a functional block diagram showing the functional configuration of an image processing unit.

FIG. 3 is a functional block diagram showing the functional configuration of the image processing unit 333. The image processing unit 333 includes, for example, best shot selection unit 41, masking processing unit 42, and corrector 43.

The best shot selection unit 41 selects an image (best shot) in which the object vehicle 2 is best shot from the moving image data in which the object vehicle 2 and the other vehicle 4 are specified. The best shot selection unit 41 outputs the best shots to the masking processing unit 42.

The masking processing unit 42 performs masking processing on the best shot. A vehicle on which the masking processing is performed is a vehicle selected in advance from among the object vehicle 2 and the other vehicle 4. The masking processing is typically performed only on the other vehicle 4. However, masking processing may be performed on both the object vehicle 2 and the other vehicle 4. Depending on the circumstances, the masking processing may be performed only on the object vehicle 2.

The region where masking processing is performed in the best shot is typically the entire vehicle of the other vehicle 4. However, the region where masking processing is performed may be a part of the vehicle (object vehicle 2 and/or other vehicle 4). For example, only the license plate may be subjected to masking processing, only the windowpane may be subjected to masking processing, or only the license plate and the windowpane may be subjected to masking processing. Instead of the entire windowpane, a person (that is, a driver (user), a passenger, etc.) seen through the windowpane may be subjected to masking processing. The masking processing region may differ between the object vehicle 2 and the other vehicle 4. It should be noted that the distinction between the entire vehicle, the license plate, the window glass, the person, etc. can be realized by a known image processing technique such as instance segmentation.

masking processing includes, for example, processing to replace a region targeted for masking processing with a specific image (specific color, pattern, character, etc.), blur processing to impart blurring to the target region (filter processing, smoothing processing, etc.), and processing to replace each pixel in the target region with surrounding pixels (mosaic processing, etc.). The masking processing unit 42 outputs the mask-processed image to the correction unit 43. The masking processing may be image synthesis processing as described below.

Figure 4:
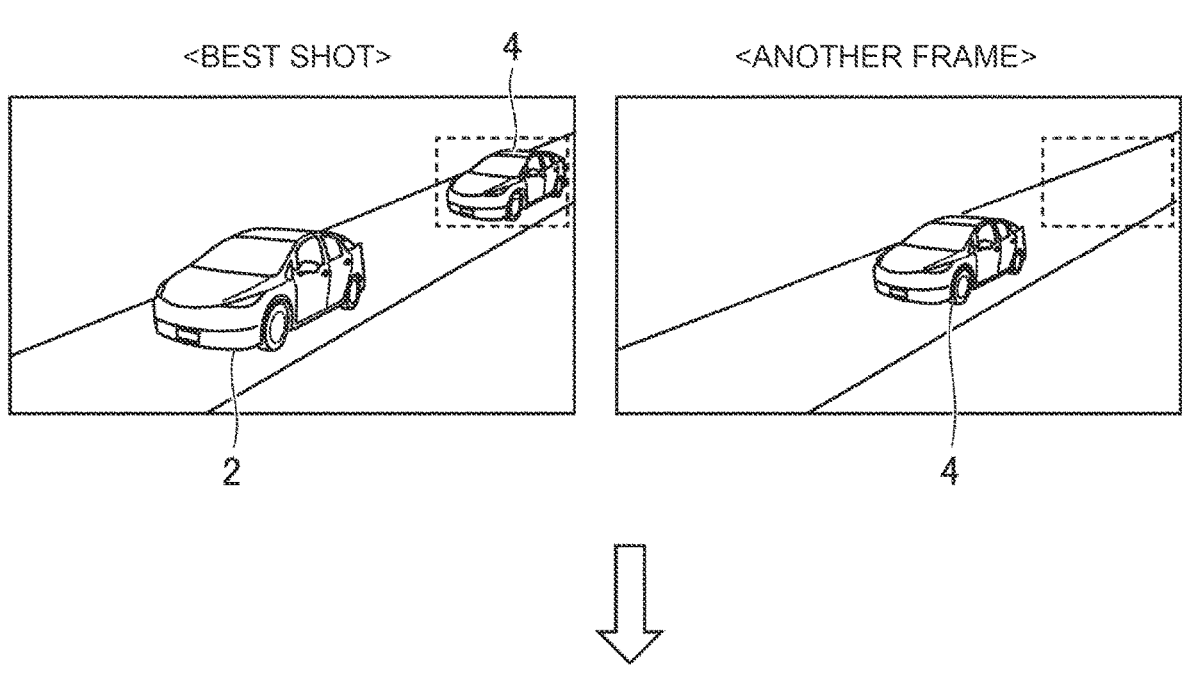
FIG. 4 is a diagram for explaining an example of masking processing.
Figure 4:
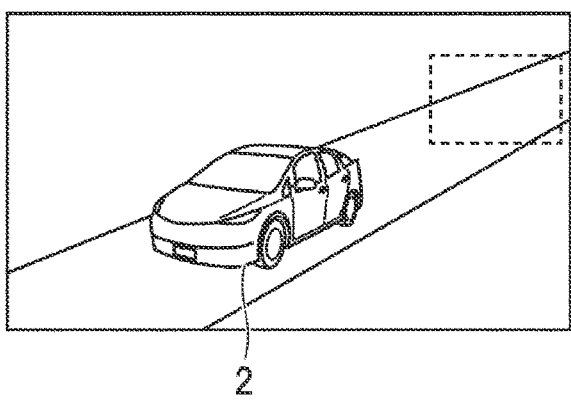

FIG. 4 is a diagram for explaining an example of masking processing. Since the camera 104 is a fixed point camera as shown in FIG. 1, the background of the vehicle is essentially unchanged. By paying attention to this point, image composition processing using another frame is possible.

Specifically, the masking processing unit 42 identifies the region where the other vehicle 4 is captured in the best shot (see the dashed line in the upper left diagram). The masking processing unit 42 searches the moving image data, and selects another frame in which the other vehicle 4 has completely moved from the shooting region (see the upper right figure). The masking processing unit 42 may detect the background using a deep learning-based object detection algorithm. Alternatively, the masking processing unit 42 may take differences between a plurality of separate frames and determine a region with a small difference as the background. Then, the masking processing unit 42 overwrites the region where the other vehicle 4 is shot with the background (see the figure below). The masking processing unit 42 may apply brush processing to the periphery of the overwritten region so as not to cause discomfort in the connected portion.

Referring to FIG. 3 again, the correction unit 43 performs various image corrections (trimming, color correction, distortion correction, etc.) on the image subjected to masking processing. The correction unit 43 outputs the corrected images to the album creation unit 334.

Returning to FIG. 2, the album creation unit 334 creates an album using images that have been subjected to various image processing including masking processing by the image processing unit 333. Known image analysis technology (for example, technology for automatically creating a photo book, slide show, etc. from images shot with a smart phone) can be used to create an album. Album creation unit 334 outputs the album to web service management unit 335.

Web service management unit 335 provides a web service using the album created by album creation unit 334 (for example, an application program that can cooperate with SNS). Note that the web service management unit 335 may be implemented in a server other than the server 3.

The shooting device management unit 336 manages (monitors and diagnoses) the vehicle shooting device 1. The shooting device management unit 336 notifies the manager of the server 3 of any abnormality (camera failure, communication failure, etc.) that occurs in the vehicle shooting device 1 under management. As a result, the administrator can take measures such as inspection and repair of the vehicle shooting device 1. The shooting device management unit 336 can also be implemented as a separate server, similar to the web service management unit 335.

Processing Flow

Figure 5:
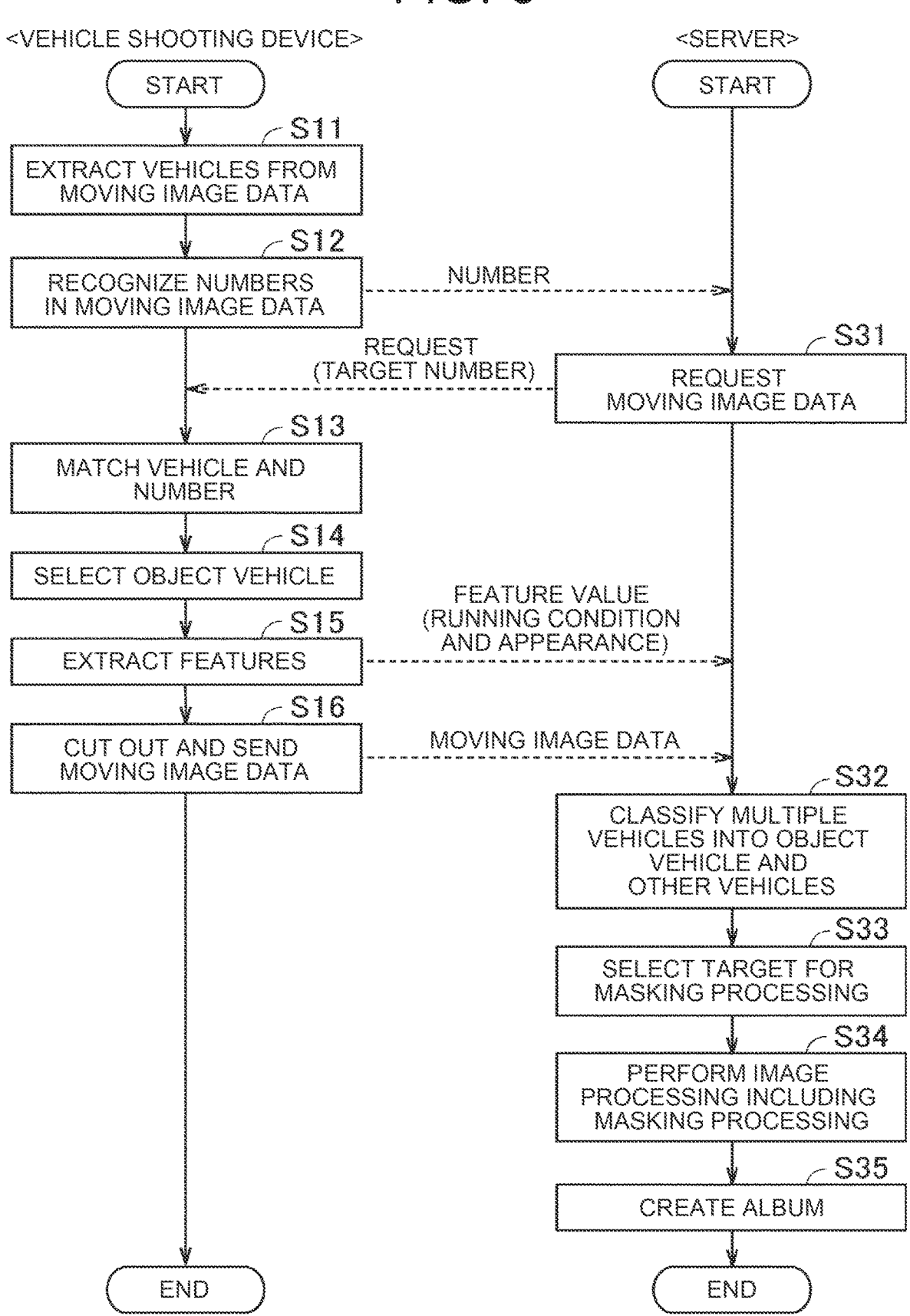
FIG. 5 is a flowchart showing the procedure of vehicle shooting and image processing according to the present embodiment.

FIG. 5 is a flowchart showing the procedure of vehicle shooting and image processing according to the present embodiment. The processing shown in this flowchart is executed when a predetermined condition is established (for example, every predetermined cycle). In the drawing, the processing by the vehicle shooting device 1 is shown on the left side, and the processing by the server 3 is shown on the right side. Each step is realized by software processing by the processor 101 of the vehicle shooting device 1 or the processor 301 of the server 3, but part or all of it may be realized by hardware (electric circuit). Hereinafter, the step is abbreviated as S.

In S11, the vehicle shooting device 1 extracts the vehicle from the moving image data. Furthermore, the vehicle shooting device 1 recognizes the number by performing number recognition processing on the moving image data from which the vehicle is extracted (S12). The vehicle shooting device 1 transmits the recognized number to the server 3.

When receiving the number from the vehicle shooting device 1, the server 3 determines whether or not the received number is a registered number (whether or not the shot vehicle is the vehicle (object vehicle 2) of the user who applied for the provision of the vehicle shooting service) by referring to the registration information. When the received number is the registered number (the number of the object vehicle 2), the server 3 transmits the number of the object vehicle 2 and requests the vehicle shooting device 1 to transmit the moving image data including the object vehicle 2 (S31).

In S13, the vehicle shooting device 1 executes matching processing between each vehicle and each number in the moving image data. Then, the vehicle shooting device 1 selects, as the object vehicle 2, a vehicle associated with the same number as that of the object vehicle 2 from among the vehicles associated with the number (S14). Further, the vehicle shooting device 1 extracts the feature quantity (driving state and appearance) of the object vehicle 2, and transmits the extracted feature quantity to the server 3 (S15).

In S16, the vehicle shooting device 1 cuts out a portion including the object vehicle 2 from the moving image data temporarily stored in the memory 102 (moving image buffer 121). In this extraction, the running state (running speed, acceleration, etc.) and appearance (body shape, body color, etc.) of the object vehicle 2 can be used. The vehicle shooting device 1 transmits the clipped moving image data to the server 3.

In S32, the server 3 extracts a vehicle by executing vehicle extraction processing on the moving image data received from the vehicle shooting device 1. Then, the server 3 classifies the extracted vehicles into the object vehicle 2 and the other vehicle 4. The server 3 identifies the object vehicle 2 based at least on the license plate information. The server 3 may use the feature quantity (driving state and appearance) of the object vehicle 2 in addition to the license plate information. Furthermore, the server 3 identifies vehicles other than the object vehicle 2 among the extracted vehicles as other vehicle 4.

In S33, the server 3 selects a vehicle to be subjected to masking processing based on a preset user operation. As described above, the server 3 selects any one of only the object vehicle 2, only the other vehicle 4, and both the object vehicle 2 and the other vehicle 4 as targets of masking processing.

At S34, the server 3 performs image processing including masking processing on the vehicle selected at S33. As described with reference to FIGS. 2 to 4, the server 3 selects the most suitable image (best shot) for viewing from the moving image data (a plurality of complaints) including the object vehicle 2. Then, the server 3 performs masking processing on the best shot. The server 3 may perform the masking processing only on the other vehicle 4 (for example, the entire vehicle of the other vehicle 4). The server 3 may perform masking processing on both the object vehicle 2 and the other vehicle 4 (for example, window glass of all vehicles). The server 3 may perform the masking processing only on the object vehicle 2 (for example, the driver (user) driving the object vehicle 2). Further, the server 3 performs image correction on the image subjected to masking processing. Then, the server 3 creates an album using the corrected images (S35). The user can view the created album and upload desired images in the album to the SNS.

As described above, in the present embodiment, after classifying a plurality of vehicles in the shot moving image data into the object vehicle 2 and the other vehicle 4, a selected one of the object vehicle 2 and the other vehicle 4 is subjected to masking processing. Thereby, the object vehicle 2 (user of the object vehicle 2) is not specified by masking the object vehicle 2, the other vehicle 4 (user of the other vehicle 4) is not specified by masking the other vehicle 4, or both of them can be performed. Therefore, according to the present embodiment, it is possible to avoid troubles associated with shooting the vehicle.

The embodiments disclosed this time should be considered to be illustrative in all respects and not restrictive. The scope of the present disclosure is indicated by the scope of the claims rather than the description of the above-described embodiments, and is intended to include all modifications within the scope and meaning equivalent to the scope of the claims.

What is claimed is:

1. An image processing system, comprising:

a memory; and a processor configured to acquire moving image data in which a plurality of vehicles is shot, classify the plurality of vehicles into an object group and a non-object group other than the object, group, based on license plate information in the moving image data, acquire a single frame from the moving image data, receive a user operation to designate a selection manner of one or more vehicles to be subject to masking processing, select the one or more vehicles from among vehicles present in the acquired single frame based on the designated selection manner, generate a processed image in which the one or more selected vehicles are masked by performing the masking processing, and store the acquired single frame and the processed image in the memory, wherein the masking processing includes fully hiding a vehicle in the non-object group present in the acquired single frame in a case where the vehicle in the non-object group is selected and a vehicle in the object group is not selected as the one or more vehicles, and hiding license plates and windows of vehicles in both the object group and the non-object group present in the acquired single frame in a case where the vehicles in the object group and the non-object group are selected as the one or more vehicles.

2. The image processing system according to claim 1, wherein the vehicle in the non-object group is fully hidden by extracting a region in which the vehicle in the non-object group is present in the acquired single frame, clipping out a region corresponding to the extracted region in another single frame of the moving image data that is different from the acquired single frame, and replacing the vehicle in the non-object group in the acquired single frame with the region that is clipped.

3. The image processing system according to claim 1, wherein the vehicles are classified into the object group and the non-object group, based on external appearance information of the vehicles, in addition to the license plate information.

4. The image processing system according to claim 3, wherein the license plate information and the external appearance information are included in registration information stored in the memory.

5. The image processing system according to claim 3, wherein the vehicles are classified into the object group and the non-object group, based on running state information, in addition to the license plate information and the external appearance information.

* * * * *